United States Patent [19]

Uno et al.

[11] 3,996,593

[45] Dec. 7, 1976

[54] EXPOSURE CONTROL DEVICE IN A CAMERA

[75] Inventors: Naoyuki Uno, Urawa; Tetsuji Shono, Ranzan; Fumio Urano, Omiya; Masahiro Kawasaki, Tokyo, all of Japan

[73] Assignee: Asahi Kogaku Kogyo Kabushika Kaisha, Tokyo, Japan

[22] Filed: Oct. 1, 1975

[21] Appl. No.: 618,598

[30] Foreign Application Priority Data

Oct. 4, 1974    Japan ............................ 49-114502

[52] U.S. Cl. .................................. 354/43; 354/53; 354/56; 354/60 L; 354/219
[51] Int. Cl.² ..................... G03B 7/12; G03B 17/20
[58] Field of Search ................... 354/23, 36, 40, 41, 354/42, 43, 45, 53, 54, 55, 56, 60 R, 60 L, 219

[56] References Cited

UNITED STATES PATENTS

| | | |
|---|---|---|
| 3,812,503 | 5/1974 | Engelsmann et al. ............ 354/60 L |
| 3,818,495 | 6/1974 | Sagara et al. ................ 354/60 L X |

FOREIGN PATENTS OR APPLICATIONS

| | | | |
|---|---|---|---|
| 2,212,054 | 9/1973 | Germany ......................... | 354/60 L |

Primary Examiner—Joseph F. Peters, Jr.
Attorney, Agent, or Firm—Sughrue, Rothwell, Mion, Zinn & Macpeak

[57] ABSTRACT

A method and apparatus for automatic iris control of cameras having an exposure value indicator located within the camera's viewfinder. The indicator emits light such that a photosensor when moving over the indicator face, senses the light and through associated circuitry and mechanisms stops the movement of an adjusting iris.

10 Claims, 5 Drawing Figures

EXPOSURE CONTROL DEVICE IN A CAMERA

BACKGROUND OF THE INVENTION

1. Field of the Invention

The invention relates to a method and apparatus to automatically control the iris adjustment of a camera having an internal exposure value indicator where this indicator is located at least within the field of view of the camera's viewfinder and the iris adjustment is controlled by the viewfinder indicator's value.

2. Description of the Prior Art

In the design and manufacture of cameras with automatic exposure control mechanisms it has hitherto been necessary to have two separate mechanisms if it was desired to provide an exposure value reading in the viewfinder of the camera as well as to automatically control the iris setting. As a result such cameras require large numbers of parts for their exposure control and viewfinder indicator mechanisms increasing the operational difficulties and errors created by those parts in addition to making the cameras bulkier and heavier than single mechanism cameras.

An object of the invention is to provide a method and apparatus whereby the iris exposure indicator in the viewfinder is utilized to provide the control mechanism for the iris setting of the camera's aperture.

A further object of the invention is to reduce the numbers of parts constituting the exposure value indicator in the viewfinder and the iris control device in the camera body as well as to reduce the operational error and provide accurate operation.

SUMMARY OF THE INVENTION

According to the present invention, the foregoing and other objects are attained by the use of an illuminated exposure value indicator contained in the viewfinder, an illumination detection device which scans the viewfinder's display and an iris adjustment mechanism which moves in conjunction with the scanning device. There is additional electronic circuitry contained in the camera which upon the illuminance detecting device's encountering the illuminated exposure value in the viewfinder, triggers a stopping mechanism which stops the changing iris value. Thus, the scanning of the viewfinder indicator to control the iris adjustment simplifies the mechanism requiring only one indicator and one aperture control device.

A BRIEF DESCRIPTION OF THE DRAWINGS

FIG. 2b is a bottom view of the same iris value indicator portion as in FIG. 2a.

DESCRIPTION OF THE PREFERRED EMBODIMENTS

Figure 1:
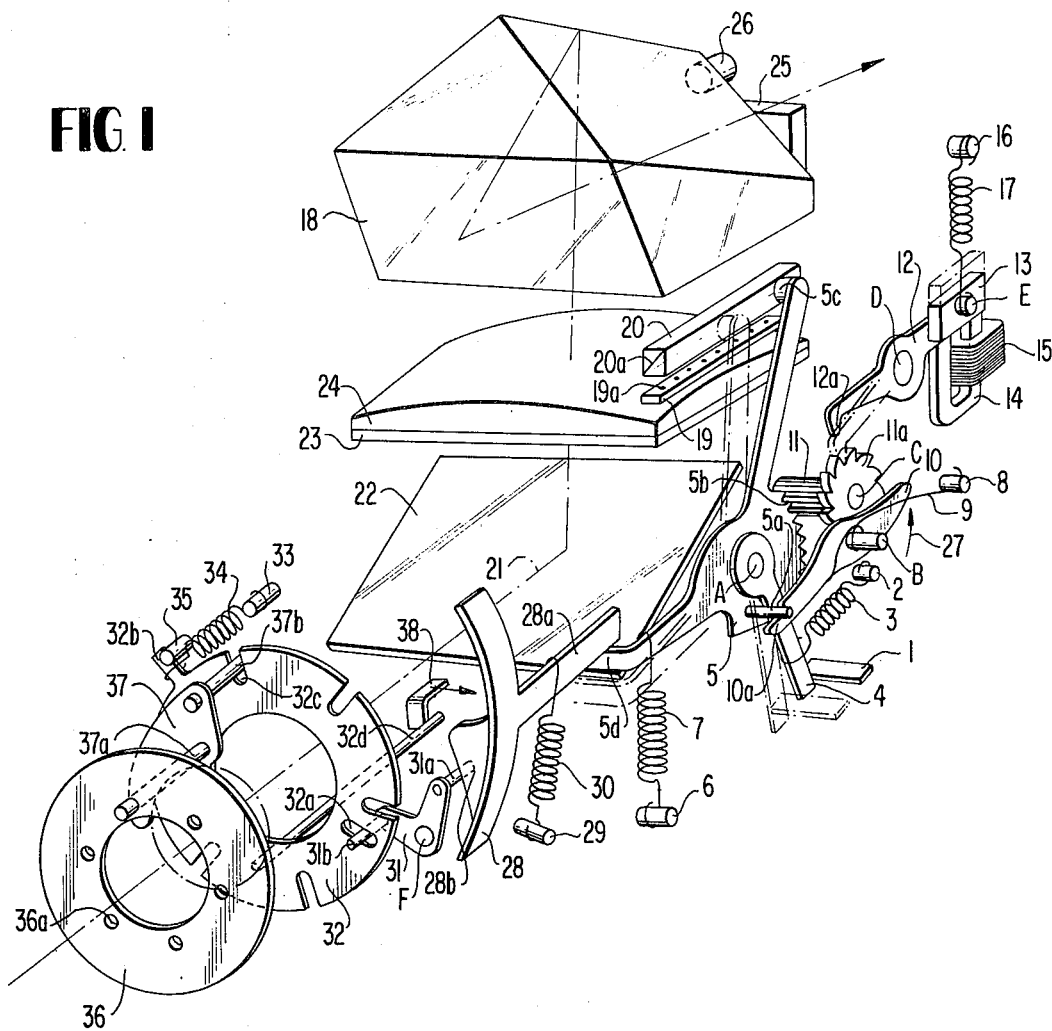
FIG. 1 is a perspective view of the preferred embodiment of the camera exposure control mechanism.

Reference is now made to the drawings wherein like reference numerals designate identical parts throughout the several views.

In FIG. 1 when a film winding lever of a camera (not shown) is wound, an interlocking lever 1 is moved frontwardly from the full line position and reaches the dotted and dashed line position and is then moved back to the full line position. At this time, a charge lever 4 fixedly mounted on the shaft A on the side of a mirror box in the camera (not shown) is always urged to be pivoted to the right by means of a return spring 3, retained between said lever and a spring catcher 2, and has its end always placed in contact with the interlocking lever 1 so that the charge lever also moves from the full line position to the dotted and dashed line and returns.

An iris decision lever 5, rotatably supported on the shaft A, is urged to be pivoted to the left by means of an iris decision lever spring 7, retained on a spring catcher 6 on the side of the mirror box. A pin 5a projecting from the iris decision lever 5 is in contact with the end of the charge lever 4 so that when the charge lever 4 is rotated as previously mentioned, the iris decision lever 5 also pivots to the right to the illustrated full line position against the iris decision lever spring 7. At that time, a stop lever 10 which is rotatably supported on the shaft B fixedly mounted on the side of the mirror box (not shown) and is always urged to be pivoted to the right by means of a torsion spring 9, one end of which is retained by a spring catcher 8, has a stop portion 10a to engage the pin 5a, and hence, the iris decision lever 5 may be stopped in the position as indicated by the full line. A sector wheel 5b, mounted on the iris decision lever 5, is always meshed with a pinion 11 rotatably supported on the shaft C which is fixedly mounted on the side of the mirror box (not shown), and a rotation of the iris decision lever 5 will rotate the pinion 11. Engaged with a ratchet wheel 11a, integral with the pinion 11, is a stop portion 12a of a stopper plate 12 rotatably supported on the shaft D which is fixedly mounted on the side of the mirror box. Mounted on a core 14, fixedly mounted on the side of the mirror box, is an electromagnet 15, which is faced to an armature 13 supported on the shaft E, fixedly mounted on the stopper plate 12. When an electric current is not conducted by the coil of said electromagnet 15, the stopper plate 12 is urged to be pivoted to the left by the action of a stopper spring 17 which is connected between a spring catcher 16 and the shaft E. When the film winding lever is wound, the iris decision lever 5 is pivoted to the right to rotate the ratchet wheel 11a counterclockwise, since the stopper plate 12 allows movement in this direction.

Figure 2A:
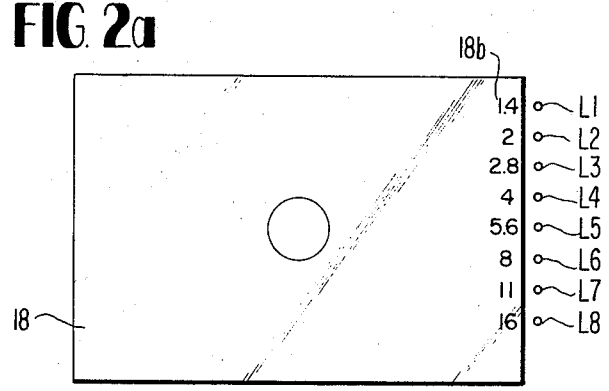
FIG. 2a is a rear elevational view of the iris value indicator portion of the viewfinder.
Figure 2B:
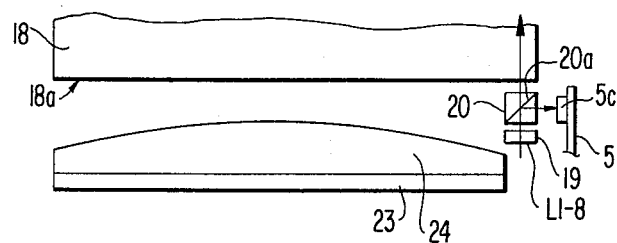

FIGS. 2a and 2b illustrate the structure of an iris value indicator portion. A group of iris graduations 18b are impressed on an incident surface 18a of a pentagonal roof prism 18. A holder 19 for holding luminous elements fixedly mounted on a camera body (not shown) has luminous elements L1, L2, . . . L8 aligned thereon (for convenience's sake, the luminous elements L1-L8 are arranged to the right of the prism 18 in FIG. 2a). A square prism 20 with a half-mirror surface 20a is fixedly mounted on the camera body, encased therein and is disposed between the incident surface 18a of the pentagonal roof prism and the luminous elements L1-L8 so as to divide the beam of light into two signals. One light segment travels straight into the pentagonal roof prism 18 and thus to the viewing eye, and the other beam of light, which is reflected to the right by 90° at the half-mirror surface 20a, is incident upon a luminance detecting element 5c fixedly mounted on the iris decision lever 5.

In FIG. 1, the light flux projected (not shown) on a photographing lens optical axis 21 is upwardly reflected at a quick return mirror 22 to form an image of the object on a focal plate 23. This image can be viewed through a condenser lens 24, the pentagonal roof prism 18, and an eyepiece 25, and the iris graduations 18b are illuminated by the light of the image formed on the focal plate 23 allowing the operator to view the iris graduations 18b as shown in FIG. 2a.

Figure 3:
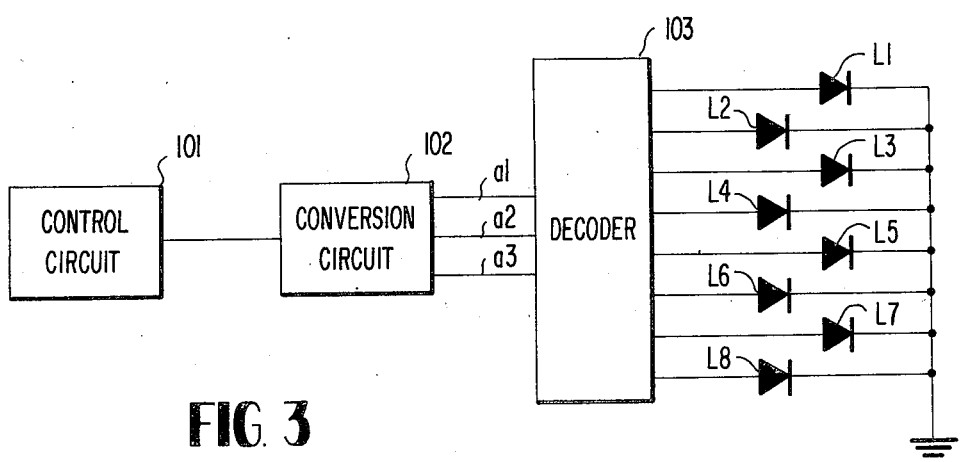
FIG. 3 is a block diagram of a typical iris value indicator system for a camera viewfinder.

FIG. 3 is a block diagram of an iris value indicator circuit. In this circuit, information of the iris value Av is outputted from control circuit block 101 on the basis of information of the brightness Bv of the object, shutter speed Tv, and film sensitivity Sv. There is shown an A-D conversion circuit 102, in which analog output information corresponding to the iris value of control circuit block 101 is converted into digital output information corresponding to the iris value. A decoder circuit block 103 is provided to control the luminous operation of the luminous elements L1, L2, . . . L8 by use of output information of the A-D conversion circuit block 102.

With the arrangement of the electric circuit as described above, the operation will be described hereinafter. In the control circuit block 101, the operation of $Av = Bv + Sv - Tv$ is effected in accordance with information of the amount $Bv$ of APEX indication for the brightness B of the object, the amount $Tv$ of indication of the shutter speed T, and the amount $Sv$ of indication of the film sensitivity S. The output of the control circuit block 101 forms information corresponding to the amount $Av$ of APEX indication of the iris value A. This information is converted into digital signals $a1$, $a2$, and $a3$ in the A-D conversion circuit block 102 which corresponds to the iris value. The decoder circuit block 103 controls the lighting of luminous elements L1, L2, . . . L8 corresponding to the initial iris value.

The relationship between the iris value, the digital signals $a1$, $a2$, and $a3$, and the lighting luminous elements is given in the following Table.

| IRIS VALUE f | a1 | a2 | a3 | LIGHTING LUMINOUS ELEMENT |
|---|---|---|---|---|
| 1.4 | 0 | 0 | 0 | L1 |
| 2 | 0 | 0 | 1 | L2 |
| 2.8 | 0 | 1 | 0 | L3 |
| 4 | 0 | 1 | 1 | L4 |
| 5.6 | 1 | 0 | 0 | L5 |
| 8 | 1 | 0 | 1 | L6 |
| 11 | 1 | 1 | 0 | L7 |
| 16 | 1 | 1 | 1 | L8 |

As shown in the Table, the iris values for proper exposure are indicated by the luminous elements L1, L2, . . . L8 (for example, in the case of f 5.6, the luminous element L5 goes on).

Figure 4:
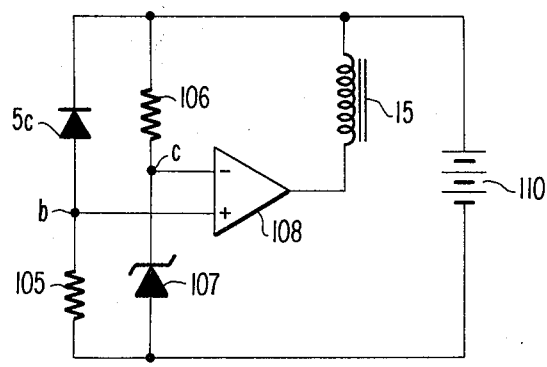
FIG. 4 is an electrical circuit schematic diagram of the preferred embodiment of the luminence amplifier.

FIG. 4 is a luminance amplfier circuit. A luminance detecting photo-diode 5c is arranged in series with a power supply 110 and a resistor 105. A constant voltage diode 107 constitutes a constant voltage circuit when in series with a resistor 106. A high input impedance operational amplifier 108 has a non-inverting input terminal connected to node b between the photo-diode 104 and the resistor 105, and an inverting input terminal connected to node between the constant voltage diode 107 and the resistor 106. The output terminal of the amplifier is connected to iris movement controlling electromagnet 15. With the arrangement of the circuit as described above, the operation should now be apparent. The voltage Vc at the inverting input terminal of the operational amplifier 108 is determined by the breakdown voltage Vs in the opposite direction of the constant voltage diode. Namely, $$Vc = Vs \qquad (1)$$

On the other hand, the voltage Vb at the non-inverting input terminal is represented by, $$Vb = ip \times R\ 105 \qquad (2)$$

where ip is a photo-current of the photo-diode and R 105 is the value of the resistor 105. If the photo-diode 5c is not subjected to a beam of light from the luminous element, the photo-current is zero, thus, $Vc > Vb$, and the electromagnet 15 is energized. If the value of R105 is preset so as to establish a relation $V_b \geq V_c$, i.e., $V_c \leq ip \times R105$ where ip is a photo-current obtained when the photo-diode 5c is subjected to a beam of light from the luminous element, the state of the operational amplifier 108 is reversed at the moment when the photo-diode receives the light beam and the current supply to the electromagnet 15 is cut off.

When the shutter release button of a camera (not shown) is depressed, a main switch in the electric circuit (not shown) is turned on and photometric element 26 disposed on the incident surface of the pentagonal roof prism 18 begins to measure light. The iris value Av at the time of photographing is determined by the brightness Bv of the object in the form of the amount of APEX indication, the film sensitivity Sv, and the shutter speed Tv which are indicated within the viewfinder. This is accomplished by emission of light from one of the luminous elements L1, L2, . . . L3 in the electric circuit to thereby illuminate one of the iris value graduations 18b corresponding thereto. At the same time, a part of the light from the luminous element is reflected at the half-mirror surface 20a and is incident upon the path of photo-diode 5c. When the main switch is turned on, the coil 15 of the electromagnet is excited, and the armature 13 is attracted by the core 14 to cause the stopper plate 12 to be pivoted to the right against the action of stopper spring 17 and the stop portion 12a at the end thereof is disengaged from the ratchet 11a, which is then free to rotate in a clockwise direction.

When the shutter button is further depressed, a lever interlocked with the shutter button (not shown) is pivoted to cause the stop lever 10 to be pivoted to the left, as indicated by the arrow 27 in FIG. 1, and as a result, the pin 5a is disengaged from the stop portion 10a to cause the iris decision lever 5 to be pivoted to the left by the action of the iris decision lever spring 7. When the iris decision lever 5 pivots to the left the detecting element 5c, mounted on the iris decision lever, is moved toward the light path of the luminous element which is lighted. Current conduction to the electromagnet 15 is cut off when the operational amplifier 108 reverses due to the flow of current ip in the detecting element 5c. The stopper plate 12 is pivoted leftward by the action of the stopper spring 17 and the stopper portion 12a at the end thereof comes into contact with and stops the ratchet 11a from being further rotated in a clockwise direction. The iris decision lever 5 is stopped in the position wherein the detecting element 5c is opposite to the luminous element which is lighted, as indicated by the dotted and dashed line in FIG. 1.

Also in FIG. 1, an iris value decision ring 28, rotatably supported on an optical axis 21, is provided on a body tube (not shown) and the ring is always urged to be pivoted to the right by means of an iris value decision ring spring 30, one end of which is retained at an associated projection 28a of said ring 28 while the other end being retained at a spring catcher 29 fixedly mounted on the bodytube. Since the side at the end of the projection 28a is always in contact with an associated projection contact portion 5d of the iris decision lever 5, the position of the iris value decision ring 28 may be determined by the iris decision lever 5. The ring 28 has its internal surface provided with a cam surface 28b, which engages a pin 31a projecting from an arm portion of a bell crank 31 rotatably supported about the lower portion of a shaft F fixedly mounted on the lens bodytube. A pin 31b projecting from the other arm portion of the bell crank 31 is received in a slot 32a formed in an iris opening and closing plate 32 rotatably supported within the lens bodytube. This iris opening and closing plate 32 is always urged to be pivoted to the right by means of an opening and closing plate spring 34, one end of which is retained at a projection portion 32b of the iris opening and closing plate 32 while the other end thereof being retained at a spring catcher 33 fixedly mounted on the lens bodytube. A stop 35 fixedly mounted on the lens bodytube is in contact with the projection portion 32b so that the plate 32 remains unmoved in its state shown in FIG. 1 and may not pivot further to the right. A hole 36a, formed in an iris blade support plate 36 which is fixedly mounted on the lens bodytube, receives therein a pin 37a projecting from an iris blade 37, which is rotatable about the pin 37a. Another pin 37b projecting from the blade 37 is received in a U-shaped groove 32c formed in the iris opening and closing plate 32.

When the photodetecting element 5c is stopped in a position corresponding to the energized luminous element among the group of luminous elements, the associated projection 28a of the iris value decision ring 28 assumes a state pivoted to the right from the position indicated in FIG. 1. Then, when the shutter button is further depressed, a stop member, in a quick return mirror operating mechanism in the mirror box (not shown) and adapted to be interlocked with the shutter button, is disengaged to allow movement of mirror 22. In conjunction with such movement an iris-interlocking lever 38 is displaced to the right, as indicated by the arrow, and therefore, an iris-pin 32d, projecting from the iris opening and closing plate 32, is forced to be pivoted to the right against the action of the opening and closing plate spring 34 to thereby pivotably close the iris blade 37. Further, when the bell crank 31 is pivoted to the right to cause the pin 31a to come into contact with the cam 28b, the iris opening and closing plate 32 is stopped, thereby determining the iris diameter of the aperture opening. Then, after the mirror 22 moves, the quick return mirror mechanism in the mirror box is actuated to trigger the shutter mechanism, thus completing exposure. Then mirror 22 is returned to its initial position and the iris-interlocking lever 38 is also moved to the left into its initial position to release the pin 32d, whereby the iris opening and closing plate 32 is rotated clockwise by the action of the opening and closing plate spring 34 to cause the projection portion 32b to come into contact with the stopper 35 and the iris blade 37 is returned to its released postion. At this time, the iris value decision ring 28 and the iris decision lever 5 are not returned to their initial position but are returned later by the film winding operation.

Although the invention has been described relative to a specific embodiment thereof it is not so limited and many modifications and variations thereof will be readily apparent to those skilled in the art in the light of the above teachings. It is therefore understood that within the scope of the appended claims the invention may be practiced otherwise than as specifically described.

What is claimed is:

1. In a method of automatic exposure control for a film camera having film sensitive to light, said camera including a shutter to open and close thus exposing the film to ambient light, a shutter release which initiates the opening action of the shutter, an adjustable iris to variably control the amount of light admitted to the film when the shutter is opened, the opening of said iris varying in size by movement from an initial position, an iris value indicator which indicates the required iris value for the existing ambient light by illuminating one of a plurality of luminous elements positioned adjacent to iris size graduations depicting the appropriate iris sizes, a luminance detecting element movable from an initial position along a path optically adjacent to said luminous elements and operatively connected to said iris for movably adjusting said iris from an initial value to the size required by the ambient light conditions, an electro-mechanical stopping element operatively connected to both the luminance detecting element and the adjustable iris such that illumination of said luminous detecting element stops said adjustable iris from any further movement, said method comprising the steps of:
    moving a luminance detecting element from an initial position and along a path which is in optical cooperation with said luminous elements, said movement being in proportion to the movement of said adjustable iris from said initial position;
    initiating said iris movement and resultant coordinated movement of said luminance detecting element by operation of said shutter release before opening of said shutter; and
    electro-mechanically stopping the iris movement prior to shutter operation when said luminance detecting element is optically positioned adjacent to said illuminated luminous element such that said iris is adjusted to the value of the graduation adjacent to said illuminated luminous element.

2. In an apparatus for automatic exposure control of a camera when taking pictures of a subject, said camera including film having a sensitivity to light, a shutter operable to open and close admitting light to said film for a period of time, an adjustable iris movable such that the amount of light admitted during shutter operation is controlled by the variable iris opening, a shutter release to initiate the iris adjustment and said shutter operation, a viewfinder to align said camera with said subject such that the image exposed on said film during shutter operation is that of said camera subject, wherein said exposure control apparatus comprises:
    an iris value indication means which illuminatingly indicates one iris value among a plurality of iris values, said one iris value being the proper iris value for the camera film exposure based upon said subject brightness;
    a luminance detecting means movable along the path of said iris value indication means to optically detect the illuminated iris value and provide a stopping signal upon detecting said illuminated iris element while moving along said path in conjunction with movement of said adjustable iris;

an iris decision means connecting said adjustable iris to said luminance detecting means such that the luminous detecting means moves in proportion to the movement of the adjustable iris;

an electro-mechanical stopping means to stop said adjustable iris upon receipt of a stopping signal;

a luminance amplifier means connected to said luminance detecting means to amplify said stopping signal from said luminance detecting means such that said signal operates said electro-mechanical stopping means and terminates further movement of said adjustable iris, said movement being terminated prior to shutter operation.

3. An apparatus as set forth in claim 2, wherein the iris value indicating means is an electronic means which combines signals indicating shutter speed, film sensitivity value and camera subject brightness to produce a coded exposure value which is displayed by illuminating one of a plurality of luminous elements located adjacent to graduations indicating an iris value.

4. An apparatus as set forth in claim 3, wherein said iris value indicating means is located within the field of view of the viewfinder such that the illuminated iris value is clearly visible in the viewfinder.

5. An apparatus as set forth in claim 2, wherein said luminance detecting means is comprised of a light sensitive diode mounted on an arm movable along a path substantially parallel and optically adjacent to said iris value indicating means.

6. An apparatus as set forth in claim 2, characterized in that said electro-mechanical stopping means is comprised of:
a rotatable ratchet wheel and means for rotation thereof responsive to said iris decision means such that when the iris decision means moves said ratchet wheel rotates;
a stopper plate rotatably mounted adjacent to said ratchet wheel and engageable therein such that rotation of said ratchet wheel is terminated;
a stopper spring which urges said stopper plate into contact with said ratchet wheel; and
an electromagnet operatively located relative to said stopper plate such that when energized said stopper plate is attracted to said electro-magnet against the urging of said stopper spring to release said ratchet wheel whereby said iris decision means is free to move.

7. An apparatus as set forth in claim 2, characterized in that said luminance amplifier means is comprised of:
a power supply having first and second leads, said first lead being connected to said luminance detecting means, and forming a first junction;
a first resistor connected at one end to said second lead of said power supply, forming a second junction, and connected at the other end to said luminance detecting means such that a current flows through said luminance detecting means and said first resistor producing a voltage across said first resistor which is proportional to the amount of light striking said luminous detecting means;
a second resistor having one end connected to said first junction;
a constant voltage diode connected to the other end of said second resistor and to said second junction such that a constant voltage is applied at the other end of said second resistor;
a high impedance operational amplifier having an inverting input terminal, a non-inverting input terminal and an output terminal, said inverting input terminal being connected to said other end of said second resistor, and said non-inverting input terminal being connected to the junction between said luminance detecting means and said first resistor, and said output terminal being connected to said electro-mechanical stopping means, such that when said luminance detecting means is not illuminated by said iris value indication means the voltage at said non-inverting terminal is less than the voltage at said inverting terminal whereby said operational amplifier produces a current flow output to said stopping means, and when said luminance detecting means is illuminated, by the iris value indication means, the voltage at said non-inverting terminal is greater than the voltage at said inverting terminal changing the output current of said operational amplifier, and forming said stopping signal to said electro-mechanical stopping means, 8. An apparatus as set forth in claim 7, characterized in that said luminance detecting means is a light sensitive diode mounted on a movable arm and said electro-mechanical stopping means is comprised of:
a rotatable ratchet wheel, means for rotation thereof responsive to said iris decision means;
a stopper plate rotatably mounted adjacent to said ratchet wheel and engageable therein such that rotation of said ratchet wheel is terminated;
a stopper spring which urges said stopper plate into contact with said ratchet wheel; and
an electro-magnet operatively located relative to said stopper plate such that when energized said stopper plate is attracted to said electro-magnet against the urging of said stopper spring to release said ratchet wheel whereby said iris decision means is free to move.

9. An apparatus as set forth in claim 3, characterized in that said luminous elements are light emitting diodes.

10. An apparatus as set forth in claim 8, characterized in that said iris value indication means is comprised of light emitting diodes and associated adjacent iris size character graduations viewable in said camera viewfinder.

* * * * *